United States Patent [19]

Schroer et al.

[11] Patent Number: 5,436,070
[45] Date of Patent: Jul. 25, 1995

[54] MAGNETIC RECORDING MEDIUM COMPRISING A POLYOXYALKYLENE OXIDE BINDER, A PHOSPHORIC ESTER DISPERSANT AND A CICULAR MAGNETIC POWDER

[75] Inventors: Wolf-Dieter Schroer; Attila Vass; Juergen Sauter; Juergen Schmidt; Guenther Kuntz, all of Munich, Germany

[73] Assignee: BASF Magnetics GmbH, Mannheim, Germany

[21] Appl. No.: 311,031

[22] Filed: Sep. 26, 1994

Related U.S. Application Data

[63] Continuation of Ser. No. 34,208, Mar. 19, 1993, abandoned, and Ser. No. 783,962, Oct. 29, 1991, abandoned.

[30] Foreign Application Priority Data

Nov. 1, 1990 [DE] Germany ............... 40 34 747.8

[51] Int. Cl.6 ............................................. G11B 5/00
[52] U.S. Cl. .................................... 428/323; 428/328; 428/332; 428/403; 428/407; 428/694 BG; 428/900; 428/694 BA; 252/62.54
[58] Field of Search ............... 428/403, 407, 694, 900, 428/694 BG, 323, 328, 332, 694 BA; 252/62.54

[56] References Cited

U.S. PATENT DOCUMENTS

| | | | |
|---|---|---|---|
| 4,197,357 | 4/1980 | Huisman | 428/539 |
| 4,400,435 | 8/1983 | Yoda et al. | 428/407 |
| 4,529,661 | 7/1985 | Ninomiya et al. | 428/425.9 |
| 4,533,565 | 8/1985 | Okita | 427/44 |
| 4,585,697 | 4/1986 | Kato et al. | 428/403 |
| 4,613,545 | 9/1986 | Chubachi et al. | 428/328 |
| 4,668,283 | 5/1987 | Houda et al. | 75/0.5 AA |
| 4,707,410 | 11/1987 | Hata et al. | 428/413 |
| 4,710,427 | 12/1987 | Yamauchi et al. | 428/407 |
| 4,746,462 | 5/1988 | Nakamura et al. | 260/403 |
| 4,748,084 | 5/1988 | Hata et al. | 428/425.9 |
| 4,761,338 | 8/1988 | Asano et al. | 428/425.9 |
| 4,891,401 | 1/1990 | Huybrechts et al. | 524/807 |
| 5,028,676 | 7/1991 | Nakachi et al. | 526/277 |
| 5,100,984 | 3/1992 | Bürge et al. | 526/240 |

FOREIGN PATENT DOCUMENTS

| | | |
|---|---|---|
| 0197608 | 10/1986 | European Pat. Off. |
| 2535277 | 10/1984 | Germany. |
| 57-058229 | 7/1982 | Japan. |
| 1414949 | 11/1975 | United Kingdom. |

OTHER PUBLICATIONS

"Concies Chemical and Technical Dictionary" p. 562 H. Bennett Mar. 1986.

Primary Examiner—Stevan A. Resan
Attorney, Agent, or Firm—Keil & Weinkauf

[57] ABSTRACT

A magnetic dispersion comprising finely divided iron power or iron alloy powder having a BET value of more than 35 m²/g dispersed in a polymeric binder and organic solvent, whose filterability is markedly improved, is obtained by using certain low molecular weight phosphoric esters of the general formula I or II

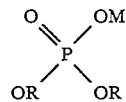

I

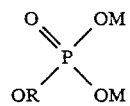

II combined with a dispersion-active compound which contains at least one polar group capable of adsorption on the magnetic pigment. The polar group of the dispersion-active compound can be an acid or alkaline or amphoteric group or a group capable of hydrogen bonding or polarization. The dispersion-active compound can be a polycondensate, a polyaddition product or a chain growth copolymer which can also be used in the magnetic dispersion combined with customary other polymeric binders.

2 Claims, 1 Drawing Sheet

MAGNETIC RECORDING MEDIUM COMPRISING A POLYOXYALKYLENE OXIDE BINDER, A PHOSPHORIC ESTER DISPERSANT AND A CICULAR MAGNETIC POWDER

This application is a continuation of application Ser. No. 08/034,208, filed on Mar. 19, 1993, now abandoned, and Ser. No. 07,783,962, filed on Oct. 29, 1991, now abandoned.

The present invention relates to a magnetic recording medium comprising a nonmagnetic base and, applied thereto, a magnetic dispersion of a finely divided magnetic pigment in a polymeric binder using as dispersant a phosphoric acid compound.

The development of magnetic recording media has for many years centered on achieving a higher recording density and an improved signal-to-noise ratio. To improve these properties, the fill level of the magnetic layer must be increased and good surface smoothness must be achieved by improving the degree of dispersion and the orientation of the finely divided magnetic pigments, which must have excellent magnetic properties.

A further requirement of magnetic recording media which are to possess a high recording density is a layer which is free of unwanted particles. This is achievable on the one hand only with magnetic dispersions which contain no agglomerates. On the other hand, the filtration of the magnetic dispersion with filters of extremely narrow pore size (around 5 μm) is necessary.

To achieve the desired dispersing properties it is an absolute prerequisite that certain binders should be used, possessing not only good binding properties but also good dispersing properties for the magnetic pigment. Such dispersion-active compounds will hereinafter be referred to as dispersing resins. They come into play when, in the magnetic dispersions, a certain proportion of the polymeric binder, between 2 and 100%, is replaced by active high or low molecular weight dispersing resins which possess very good affinity for the finely divided magnetic pigment. These dispersing resins are chemical compounds which are obtained from monomer units by chain growth polymerization, polycondensation or polyaddition and which contain at least one polar group suitable for adsorption on the surface of the magnetic pigment. This, however, will in certain circumstances increase the viscosity of the magnetic dispersion to an extreme degree, giving rise to problems which increase in severity with the degree of fine division of the magnetic pigment and which will be more particularly described in what follows.

Especially magnetic dispersions which contain finely divided metal powders having a BET value of more than 35 $m^2/g$ as magnetic pigment can have a high flow limit if formulated using conventional formulation constituents such as polymeric binders, which is why they are very difficult to filter and require the use of special filtration apparatus, in particular when the magnetic dispersion has stood for a long time during the production process, as may easily happen for example in the event of an interruption to the production process.

There has been no shortage of attempts to achieve the necessary homogeneity of dispersion.

By subjecting the magnetic dispersion to intensive milling it is possible to achieve a certain degree of homogeneity, but, owing to varying degrees of interlinking or sintering of the pigment agglomerates, the more readily divisible pigment portion will already be markedly overmilled before the sintered pigment needle portion has been adequately comminuted. Especially in the case of metal pigments the surface layer, which provides stability against oxidation, can be destroyed.

For instance, JP 62-041 274 tries to account for the required differing intensity of dispersing over the total grinding time by adding different amounts of solvent at different times of the dispersing process, but this has the disadvantage that, during the grinding time, the recipe components are present in differing concentration, as a result of which it is necessary to accept nonuniform adsorption, which leads to dispersions of short storage life.

In JP-N 56/148 727, following adjustment of the dispersion viscosity with pure solvent, a residual portion of dispersant is additionally added prior to the dispersing process. The stepwise addition of solvent during the dispersing process, as described in JP 61/090330, makes possible only the paste viscosities required for kneader dispersing.

DE-A-39 05 910 proposes adding just enough dispersant in several stages during the fine dispersing of the magnetic dispersion as pigment surface is being continuously re-formed during the dispersing process. DE 10 05 754 discloses adding certain phosphoric esters to reduce the viscosity of a dispersion prepared with conventional binders. Furthermore, DE-A-25 35 277 and U.S. Pat. No. 4,533,565 disclose coating the surface of the magnetic pigment with certain compounds such as polymerizable alkylene oxides or compounds having polar groups before these pigments are added to the magnetic dispersion. DE 22 50 384 describes using for a magnetic recording medium which contains $CrO_2$ as magnetic pigment, a dispersant comprising alkylarylsulfonic acids alone or mixed with phosphoric esters or with alkoxylated alkylphenols. Some of the dispersants described therein are natural products, such as the well-known lecithin, which varies in composition from lot to lot and, what is more, is usable in magnetic recording media only in a highly purified form. Said reference further describes a mixture of mono- and diesters of phosphoric acid. This mixture has the disadvantage of a relatively high inactive neutral content of alcohols which have not been reacted with phosphoric acid.

Altogether, the cited prior art offers no indication as to how magnetic dispersions, in particular of finely divided magnetic pigments which have a BET value of more than 35 $m^2/g$, can be used to obtain a filterable composition even under the customary production conditions using fine filtration.

It is an object of the present invention to obtain for a magnetic dispersion which contains the abovementioned dispersing resins a dispersion composition which, having an industrially manageable flow limit, permits filtration even through fine-pore filters having a pore size of ≦5 μm. This filterability shall survive even a prolonged time of standing, and the necessary mechanical and magnetic properties of a recording medium for a high recording density shall also be met.

It has been found, surprisingly, that this object is achieved by a magnetic recording medium having the features mentioned in the Further details of the invention are revealed in the description.

The essence of the invention is that at least some of the binder is a dispersing resin to which are added, to achieve the above-stated object, certain phosphoric esters of the general formula I and/or II:

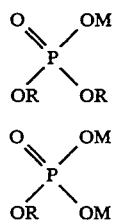

where
M = H, Na, K, NR$_3'$, HNR$_2''$
R' = R'' = C$_1$–C$_{22}$-alkyl
R = alkyl C$_2$–C$_{22}$;
 = phenylalkyl;
 = alkoxyalkyl (—CH$_2$—CH$_2$O)$_n$—R';

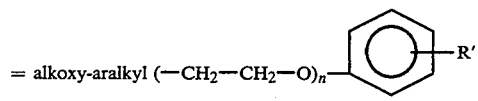

n = 1–10.

The novel combination markedly improves the filterability of the magnetic dispersion, even small additions of the abovementioned compound being sufficient, as will also be apparent from the examples which follow.

In what follows, the dispersing resins are more particularly described.

Suitable chain growth polymers are copolymers of vinyl monomers, in particular vinyl chloride, vinyl acetate or acrylates with monomers which contain polar groups suitable for adsorption on the surface of the magnetic pigment. Polycondensates can be for example polyesters, phenol-formaldehyde and melamine-formaldehyde resins, polyamides, polyamines or epichlorohydrin resins which contain a polar group suitable for adsorption on the pigment surface.

Polyaddition products can be polyurethanes of widely varying composition, for example polyester- or polycarbonate-polyurethanes, which contain a polar group suitable for adsorption on the pigment surface.

For the purposes of the present invention, polar groups suitable for adsorption on the pigment surface are acid, basic and amphoteric groups but also groups capable of hydrogen bonding and polarization.

Examples of acid groups are phosphate or phosphonate, sulfate or sulfonate and also carboxyl groups.

Examples of basic groups are primary, secondary or tertiary amines, attached in side chains or incorporated into ring structures or into the main chain.

Amphoterics are structures which contain acid and basic hetero atoms or groups in adjacency. Examples are betaines, sulfobetaines, which are known for example from EP 0 343 576 and also phosphobetaines.

Examples of groups capable of hydrogen bonding are hydroxyl and amide groups. Examples of groups capable of polarization are nitrile and epoxy groups.

Similarly, as dispersion-active compounds it is possible to use polyalkylene oxides, in particular polyethylene and polypropylene oxides, polyepichlorohydrins and copolyaddition products of said compounds which contain at least one polar group suitable for adsorption on magnetic pigment.

As dispersing resins it is also possible to use combinations of the aforementioned chain growth polymers, polyaddition compounds and polycondensates. The molecular weight of the compounds mentioned comprises the range customary for polymers and is limited in the upward direction only by the requirement of solubility in the customary organic solvents defined hereinafter and by the technical handling characteristics of the products. It preferably comprises on average in the range from 800 to 1,000,000, especially from 1,200 to 200,000.

Of particular suitability for the magnetic dispersion in the context of the present invention are dispersing resins, the copolymers of vinyl chloride with vinyl acetate and vinyl alcohol and/or comonomers which contain carboxyl, sulfonic acid, phosphonic acid or amino groups, or polyurethanes which contain sulphonic acid, phosphonic acid, amino groups or nitrogen-containing heterocycles, also polyester-modified polyamines and polyalkylene oxide-modified polyacrylic acids.

The aforementioned dispersing resins can be mixed with the customary polymeric binders as known for magnetic dispersions from numerous publications, in which case the proportion of dispersing resin within the overall binder can be from 2 to 100%, depending on the nature of the dispersion-active compound.

Further binders for the magnetic recording media according to the present invention are for example copolymers of vinyl chloride, vinyl acetate and vinyl alcohol, copolymers of vinylidene chloride and acrylonitrile, polyvinyl acetals such as polyvinyl formals, polyester/polyurethanes, polycarbonate/polyurethanes, polyurethane or polyether elastomers, phenoxy or epoxy resins, and mixtures thereof.

As solvents for all aforementioned polymeric binders it is possible to use for example tetrahydrofuran, dioxane, dimethylformamide, cyclohexanone, methyl ethyl ketone, toluene, methyl isobutyl ketone and others, optionally also when mixed.

The low molecular weight phosphoric esters of the general formula I and/or II are selected from a multiplicity of compounds known per se, of which some will be mentioned hereinafter by way of example. The amount to be used can be determined by every person skilled in the art himself or herself in an appropriate number of experiments; relevant examples will be given later. Of particular suitability are di-2-ethylhexyl phosphate (C$_{16}$H$_{35}$O$_4$P) and dibutyl phosphate (C$_8$H$_{19}$O$_4$P).

Of course, the dispersants mentioned can also be combined with other dispersants, for example highly purified lecithin, cephalin, fatty acid amines or diamines, fatty acid amides or diamides, fatty acids or ammonium salts thereof, ethoxylated fatty acid derivatives, aliphatic or aromatic optionally ethoxylated phosphoric esters, sulfosuccinic esters, sorbitan esters, aliphatic or aromatic sulfonic acids or sulfonates, fatty alcohol sulfates and many others.

As magnetic pigment preference is given to using acicular particles of iron or an iron alloy such as iron-cobalt and/or iron-nickel having an average particle length of from 0.1 to 1.0 μm and a BET value of more than 35 m$^2$/g.

Similarly, the magnetic pigment used can be finely divided γ-Fe$_2$O$_3$, Fe$_3$O$_4$, cobalt-doped Fe$_3$O$_4$ or ferromagnetic chromium dioxide.

The magnetic pigment is intensively mixed with the abovementioned binders or optionally binder mixtures in a suitable amount of solvent with the addition of a suitable amount of the dispersant(s) mentioned according to the present invention and subjected to a predispersing operation, which can be carried out for example in a dissolver, a kneader, a colloid mill, a ball mill or other high-shear apparatus. The second stage of the dispersing process is carried out for example in a bead mill whose grinding intensity can be controlled through variation of the grinding media size and charge, the speed of rotation and the rate of throughput of magnetic dispersion. To obtain as narrow a pigment distribution as possible, the magnetic dispersion is preferably run in a plurality of passes from a first reservoir vessel into a second reservoir vessel via one or more—for example—bead mills.

On completion of this fine dispersing stage, further polymeric binders or further additives such as lubricants, crosslinking agents and crosslinking catalysts may be mixed into the magnetic dispersion. The subsequent coating of the nonmagnetic base with the magnetic dispersion is carried out in accordance with the state of the art, for example by means of reverse roll coaters, halftone printing or extruder casters. As nonmagnetic base materials it is possible to use films made of polyester, such as polyethylene terephthalate, polyolefins such as polypropylene, cellulose derivatives such as triacetate, polycarbonates or rigid materials made of nonmagnetic metals such as aluminum or ceramics. The further processing of the magnetic recording medium such as surface smoothing by calendering, cutting and cassetting is carried out in a conventional manner.

Figure 1A:
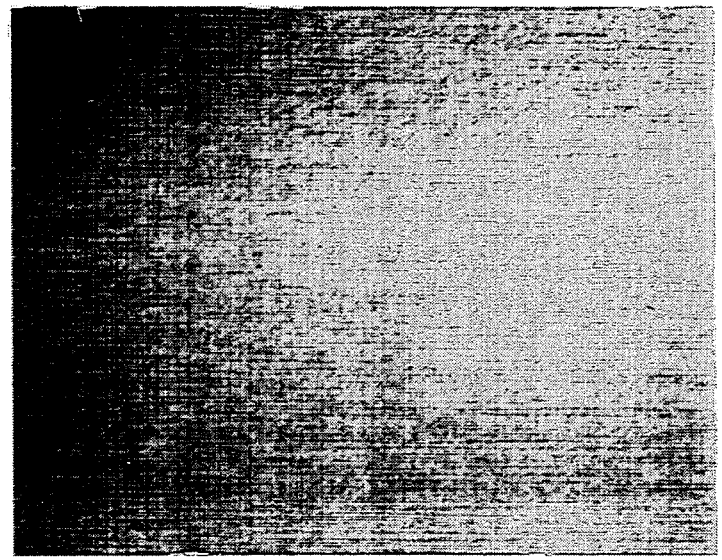
FIG. 1A is a photograph of the surface of the recording medium of the invention.

The invention will now be more particularly described with reference to a number of examples without, however, limiting the invention to these examples.

EXAMPLE 1

A mixture was prepared from the following ingredients (all parts are by weight):

Part 1

25 parts of tetrahydrofuran (THF)

0.8 part of 25% strength dispersing resin 1 (vinyl chloride, vinyl acetate, vinyl alcohol copolymer) solution in THF 1.0 part of 20.4% strength polyester polyurethane solution in THF 2.4 parts of 25% dispersing resin 2 (carboxyl-containing polyalkylene oxide acrylate) solution in THF 0.2 part of fatty acid mixture ($C_{14}$–$C_{18}$)

10 parts of finely divided acicular pure iron pigment (BET value 56 $m^2$/g, coercive force 120 kA/m, aspect ratio 5:1)

After 7 hours' predispersing a suspension of 11 parts of finely divided aluminum oxide and 2.4 parts of THF was added.

Part 2

To 21.4 parts of the predispersion thus obtained was added 0.025 part of di(ethylhexyl) phosphate, and the mixture was dispersed for a further 30 minutes and then ground ultrafine in 7 passes in a pearl mill. Then a mixture of 1.94 parts of THF 1.255 parts of 25% strength dispersing resin 1 solution in THF 1.535 parts of 20.4% strength polyester-polyurethane solution in THF were stirred in and stirred for 15 minutes with a disperser. The dispersion obtained had the following properties, the flow limit being measured with a Carimed instrument:

Gloss: 66.8%

Solids content: 25.4%

Flow limit 25 Pa

The dispersion was filtered through a Pall Profile filter having a pore size of 5 μm, 20 l of dispersion passing therethrough in 24 minutes under a maximum pressure difference of 0.4 bar.

On addition of a crosslinking agent (diisocyanate) the dispersion was cast onto a polyester base in a dry film thickness of 3.5 μm and the magnetic particles were oriented in the longitudinal direction and dried, and this was followed by longitudinal cutting to the use width of 8 mm. Testing of the magnetic recording medium thus obtained gave the results:

Number of dropouts: 10/min

Surface roughness (Ra): 0.008 μm

EXAMPLE 2

Example 1 was repeated, except that the magnetic pigment used was a finely divided acicular iron-cobalt pigment having a BET value of 52 $m^2$/g, a coercive force of 124 kA/m and an aspect ratio of 3:1.

This composition likewise gave a readily filterable dispersion, which was used to produce a magnetic recording medium having similar properties to that of Example 1.

EXAMPLE 3

A magnetic dispersion was prepared as in Example 1 but without any dispersant.

This dispersion was admixed with increasing amounts of di(ethylhexyl) phosphate (DEHP), and the table below shows the results obtained, namely the flow limit and also the throughput of dispersion on filtration through a Pall filter of 5 μm pore size, by determining, gravimetrically, the amount of filtrate which passed through under a pressure difference of 1.2 bar over an area of 0.7 $cm^2$ until the filter was 100% blind.

| DEHP | Flow limit $\tau$ p (Pa) | Throughput g |
| --- | --- | --- |
| 0.5% | 24.1 | 8 |
| 1% | 24.8 | 20 |
| 1.5% | 25.9 | 30 |
| 2% | 24.9 | 70 |

COMPARATIVE EXAMPLE 1

A dispersion was prepared as described in Example 1, but the addition of DEHP in part 2 was left out. The dispersion obtained had the following properties:

Gloss: 68.7%

Solids content: 25.4%

Flow limit $\tau$ p 27 Pa

This dispersion was impossible to filter through a Pall Profile filter of 10 μm pore size even on application of a pressure difference of 1.2 bar.

Figure 1B:
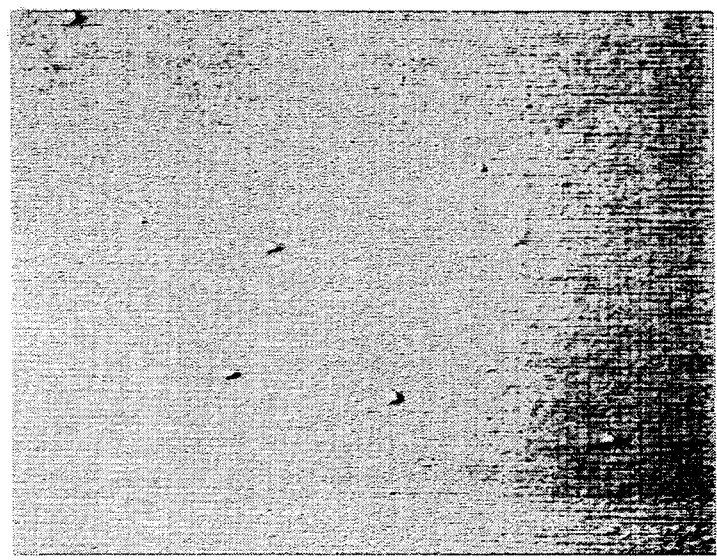
FIG. 1B is a photograph of the surface of a prior art comparative medium.

The Pall Profile filter had to have a pore size of 15 μm before 20 l could pass through it in the course of 32 minutes under a maximum pressure difference of 0.8 bar. A magnetic recording medium produced from this dispersion had a dropout rate of 30/min and showed numerous agglomerations (FIG. 1b), whereas a recording medium produced as described in Example 1 had a smooth surface (FIG. 1a), as a comparison of two photographs (each recorded with a magnification of 50×) shows.

EXAMPLE 4

A mixture was prepared from the following ingredients (all parts are by weight):
100 parts of $CrO_2$ (BET 30 m²/g, $H_c$ 50.3 kA/m)
8.14 parts of polyester-polyurethane
4.74 parts of vinyl copolymer with hydroxyl groups
2.40 parts of ultrapure lecithin
0.24 part of diethylhexyl phosphate
0.35 part of lubricant (fatty acid)
149.5 parts of tetrahydrofuran
21.6 parts of cyclohexanone The mixture was ball milled for 7 hours. Then the dispersion was filtered through a 5 μm filter and, on addition of a crosslinking agent (diisocyanate), cast by means of an extruder caster onto a polyester base in a dry weight of 5.2 g/m², which was followed by orienting the magnetic particles in the longitudinal direction, drying and calendering. The finished magnetic recording medium was cut longitudinally to the use width of 12.5 mm (half inch).

EXAMPLE 5

Example 4 was repeated, except that 1.2 parts of ultrapure lecithin and 1.2 parts of diethylhexyl phosphate were added.

COMPARATIVE EXAMPLE 2

Example 4 was repeated, except that no diethylhexyl phosphate was added.

Results

The table which follows shows the relevant measurements for a videotape, improvements in respect of modulation noise (MN at 50 kHz), color interference modulation (CIM) and the S/N values concerning luminance and chroma being notable. The measurements contain the relative dB improvements. The measurements were carried out on a JVC HR D 210 EG recorder.

TABLE

|  | Example 4 | Example 5 | Comparative Example 2 |
| --- | --- | --- | --- |
| S/N L (dB) | 0.1 | 0.6 | 0 |
| S/N Cr (dB) | 0.6 | 1.1 | 0 |
| MN at 50 kHz (dB) | 0.8 | 1.9 | 0 |
| CIM (dB) | 1.1 | 3.0 | 0 |

We claim:

1. A magnetic recording medium comprising a non-magnetic base and, applied thereto, at least one magnetic dispersion comprising (i) an acicular magnetic pigment having an average particle length of from 0.1 to 1.0 μm, (ii) at least one polymeric binder, 2–100% by weight of which binder is a polyoxyalkylene oxide which has at least one polar group, wherein the polar group is an acid or alkaline or amphoteric group or a group capable of hydrogen bonding or polarization, and at least one polar group adsorbed on the magnetic pigment, and (iii) a phosphoric ester dispersant, wherein the magnetic dispersion is prepared by, (1) predispersing the magnetic pigment in a binder wherein 2–100% by weight of the binder is a polyalkylene oxide which contains at least one polar group capable of adsorption on the magnetic pigment, and (2) subsequent to the predispersion, adding the phosphoric ester, wherein the phosphoric ester is of the formula I or II:

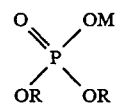

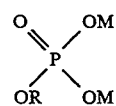

where
M=H, Na, K, NR$_3$', HNR$_2$''
R'=R''=C$_1$-C$_{22}$-alkyl
R=alkyl C$_2$-C$_{22}$;
=phenylalkyl;
=(—CH$_2$—CH$_2$O)$_n$—R';

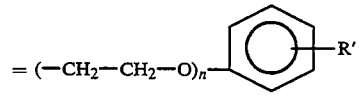

n=1–10.

2. A magnetic recording medium comprising a non-magnetic base and, applied thereto, at least one magnetic dispersion of a magnetic pigment which is (i) an acicular iron powder or an acicular iron alloy powder having an average particle length of 0.1 to 1.0 μm and a BET value of more than 35 m²/g, (ii) a polymeric binder, 2–100% by weight of which binder is a carboxyl-containing polyalkylene oxide acrylate and (iii) a phosphoric ester dispersant, wherein the magnetic dispersion is prepared by:

(1) predispersing the magnetic pigment in the binder (2) subsequent to the predispersion step, adding the phosphoric ester, wherein the phosphoric ester is one of the formula I or II:

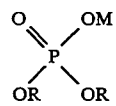

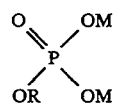

where
M=H, Na, K, NR$_3$', HNR$_2$''
R'=R''=C$_2$-C$_{22}$-alkyl
R=alkyl C$_2$-C$_{22}$;
=phenylalkyl;
=(—CH$_2$—CH$_2$O)$_n$—R';

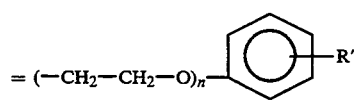

n=1–10.

* * * * *

UNITED STATES PATENT AND TRADEMARK OFFICE
CERTIFICATE OF CORRECTION

PATENT NO.: 5,436,070

DATED: July 25, 1995

INVENTOR(S): SCHROER et al.

It is certified that error appears in the above-identified patent and that said Letters Patent is hereby corrected as shown below:

On the title page, item [54] and Col. 1, line 5,

In the title, "A CICULAR" should read --ACICULAR--.

Column 8, claim 2, line 40, after "in the binder" insert
--which is subsequently adsorbed on the magnetic pigment and--.

Signed and Sealed this

Seventeenth Day of October, 1995

Attest:

BRUCE LEHMAN

*Attesting Officer*  Commissioner of Patents and Trademarks